United States Patent [19]
Malek et al.

[11] Patent Number: 5,668,813
[45] Date of Patent: *Sep. 16, 1997

[54] DYNAMIC SYNCHRONIZATION CODE DETECTION WINDOW

[76] Inventors: Charles J. Malek, 915 Camelot Dr., Crystal Lake, Ill. 60014; David L. Weigand, 1035 Aster Ave., Sunnyvale, Calif. 94086

[*] Notice: The term of this patent shall not extend beyond the expiration date of Pat. No. 5,598,419.

[21] Appl. No.: 620,089

[22] Filed: Mar. 21, 1996

Related U.S. Application Data

[63] Continuation-in-part of Ser. No. 502,875, Jul. 17, 1995, Pat. No. 5,598,419.

[51] Int. Cl.⁶ .................... H04J 3/06; H04L 7/00
[52] U.S. Cl. ............................ 370/514; 375/368
[58] Field of Search .................. 370/105.4, 105.1, 370/94.2; 375/365, 368, 364

[56] References Cited

U.S. PATENT DOCUMENTS 5,054,060  10/1991  Werdin et al. .................. 379/324
5,177,740  1/1993  Toy et al. ..................... 370/100.1

*Primary Examiner*—Douglas W. Olms
*Assistant Examiner*—Matthew C. Phillips
*Attorney, Agent, or Firm*—Skjerven, Morrill, MacPherson, Franklin & Friel; Brian D. Ogonowsky

[57] ABSTRACT

A TDMA communication system having a selectable synchronization code receive window is described. To eliminate any false detections of a synchronization code, a selectable window is created during which the synchronization code is expected to appear. The size of the window is reduced once the synchronization code is detected. In one embodiment, the size of the window is based on the elapsed time since the last synchronization of the TDMA system.

7 Claims, 10 Drawing Sheets

5,668,813

DYNAMIC SYNCHRONIZATION CODE DETECTION WINDOW

CROSS REFERENCE TO RELATED APPLICATIONS

This is a continuation-in-part of U.S. application Ser. No. 08/502,875, filed on Jul. 17, 1995, now U.S. Pat. No. 5,598,419, entitled "Multi-Tasking Sequencer For a TDMA Burst Mode Controller," assigned to the present assignee.

FIELD OF THE INVENTION

This invention relates to time division multiple access (TDMA) communication systems and in particular to a sequencer which controls various functions in the TDMA system.

BACKGROUND

In a TDMA communication system, a number of transmitters can transmit on the same frequency channel, but at different times. A remote receiver for receiving a particular transmitted signal knows beforehand at what time the transmitted signal will occur and is enabled only during that time. The use of TDMA makes very efficient use of the frequency spectrum since multiple users may use the same frequency channel at the same time without interfering with one another. FIG. 1 illustrates one type of TDMA system where a plurality of wireless telephones 10, 11, 12, and 13 share a same frequency channel while transmitting to and receiving from a high power transponder base cell 14. All communications between telephones 10–13 are routed through base cell 14. Such a TDMA system may be the Personal Handy Phone System whose requirements are described in the RCR Standard-28, incorporated herein by reference. As an alternate embodiment, such a TDMA system may be the ETSI DECT standard, also incorporated herein by reference. Further, slow frequency hopping systems, compliant with CFR Title 47, part 15, and intended for the U.S. ISM-bands, may be derived from the aforementioned formal standards.

In a TDMA system, each remote transceiver, when active, is allocated certain time slots within which it may transmit a bursted signal or receive a bursted signal. FIG. 2 illustrates a frame 16 containing slots 0 through 7, where frame 16 is repeated on a single frequency channel. The period of frame 16 may be, for example, 5 milliseconds. Assuming all four wireless telephones 10–13 in FIG. 1 are being actively used at the same time, telephones 10, 11, 12, and 13 may be allocated slots 0, 1, 2, and 3, respectively, for transmitting bursted signals to base cell 14, while telephones 10, 11, 12, and 13 may be allocated slots 4, 5, 6, and 7, respectively, for receiving bursted signals from base cell 14. The amount of information stored in each of telephones 10–13 during a frame period is transmitted in a burst within a single slot.

A sample protocol 18 for a slot is also shown in FIG. 2, where protocol 18 dictates the information required to be transmitted during a single slot. Protocol 18 may consist of a ramp-up field 20, a start symbol field 21, a clock recovery field 22, a slot sync (or Unique Word) field 23, a data field 24, a CRC field (for error correction and verification), and a guard band field 26. The lengths and types of fields in a protocol vary depending on the mode of the transceiver (e.g., set up mode, transmit/receive mode, etc.) While in the traffic mode, where voice is to be transmitted, data field 24 contains audio data. Data field 24 is referred to as the traffic channel or TCH.

In one embodiment, the bit rate of the transmitted bits in a frame 16 is approximately 384K bits per second, and the corresponding symbol rate is, therefore, 192K symbols per second.

FIG. 3 is a basic illustration of one type of TDMA communication system. ROM 34 contains certain program instructions for a microprocessor 36 connected to a system bus 38. RAM 40 is used for storing information for various purposes, such as storing program variables, mailbox information, and stack parameters.

The portion of the TDMA system which creates the various slots and controls the timing of the information within each of the slots is the burst mode controller (BMC) 42. Generally, the BMC 42 consists of a BMC bus controller 44, a voice coder 46 for generating PCM audio data for the data field in a slot, a data RAM 48 containing certain data and protocol bits to be inserted into a slot, and a sequencer 50 which controls the overall bit synchronization of a slot as well as controls the activation of the various modulator interface modules 51 which either sink or source the bits within a slot. Also shown is a block 52 designating other devices unrelated to an understanding of the invention, which would be conventional and understood by those skilled in the art.

A peripheral bus interface unit 56 is also connected to system bus 38 and controls access to the peripheral bus 57, to which is connected various input/output devices 58 and other interfacing devices 59 necessary for telephones 10–13 to transmit RF signals and receive RF signals.

FIG. 4 illustrates the pertinent portions of a conventional sequencer 50. Sequencer 50 includes a core 60 whose output is a multi-bit control signal which controls various devices and operations in the TDMA system to generate bits for transmission in a slot at the proper bit times. By selectively enabling and disabling the devices and operations at the proper times, the correct protocols for a slot are generated, as shown in FIG. 2, along with the synchronized insertion of data and CRC bits. The particular sequencer 50 routine carried out is determined by the addressed instructions in a microcode memory 62. For example, a first type of protocol would be created by sequencer 50 during a set-up mode, and a different protocol would be set up for a voice communication (traffic mode).

Sequencer 50 uses a microcode RAM 62 containing a main program 64 along with various subroutines, such as a transmit subroutine 66 and a receive subroutine 68, although many other sub-routines may also exist as would be understood by those skilled in the art. A bit rate oscillator 70, whose bit rate and phase have been adjusted to be synchronized with the base cell 14 (FIG. 1) bit rate, controls the timing of core 60 so that the control code outputs are synchronized with the required slot timing.

The main program 64 is a sequential program typically containing no conditions. The microprocessor 36 (FIG. 3) needs to insert a jump command at the proper time into the main program 64 in order for the microcode to jump to a particular subroutine, such as transmit or receive.

Additionally, the microcode in sequencer 50 is developed for a standard use of the TDMA system. However, certain TDMA systems may require different protocols or slightly different sequences. For these specialized protocols, the microprocessor 36 in FIG. 3 must then transfer the appropriate instructions from ROM 34 into the microcode RAM 62 at the proper times to create the custom protocols.

Microcode RAM is much larger than microcode ROM and takes up considerable silicon real estate. Additionally, the interaction of the microprocessor 36 with the sequencer microcode creates complex timing considerations. This conventional type of sequencer 50 is also limited in other respects.

Further, while attempting to obtain and maintain synchronization of the frame and slots, the system is susceptible to synchronizing on a false slot synchronization code when the synchronization code is duplicated by coincidence by noise or data. Such falsing rates in an AWGN channel are a consequence of the bit rate, the number of errors to be allowed, and the length of the Unique Word field to be correlated against. These falsing rates are specified by the binomial theorem.

What is needed is a more flexible sequencer whose microcode does not need to be reprogrammed by a microprocessor. What is also needed is a TDMA system which is less susceptible to false synchronization codes.

SUMMARY

A method for virtually eliminating any false detections of a synchronization code is described which creates a selectable window during which the synchronization code is expected to appear. The size of the window is reduced once the synchronization code is detected. In one embodiment, the size of the window is based on the elapsed time since the last synchronization of the TDMA system. A coincidental replication of the synchronization code outside the window does not trigger false synchronizations.

DETAILED DESCRIPTION OF THE PREFERRED EMBODIMENTS

Figure 1:
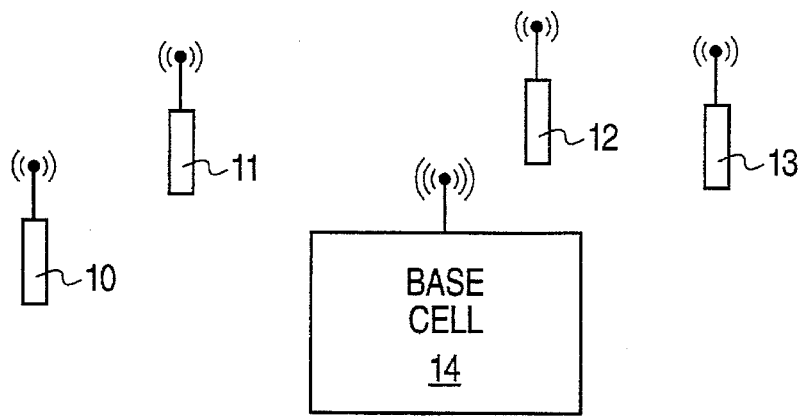
FIG. 1 illustrates a prior art base cell and portable telephone transceivers in a TDMA system.
Figure 5:
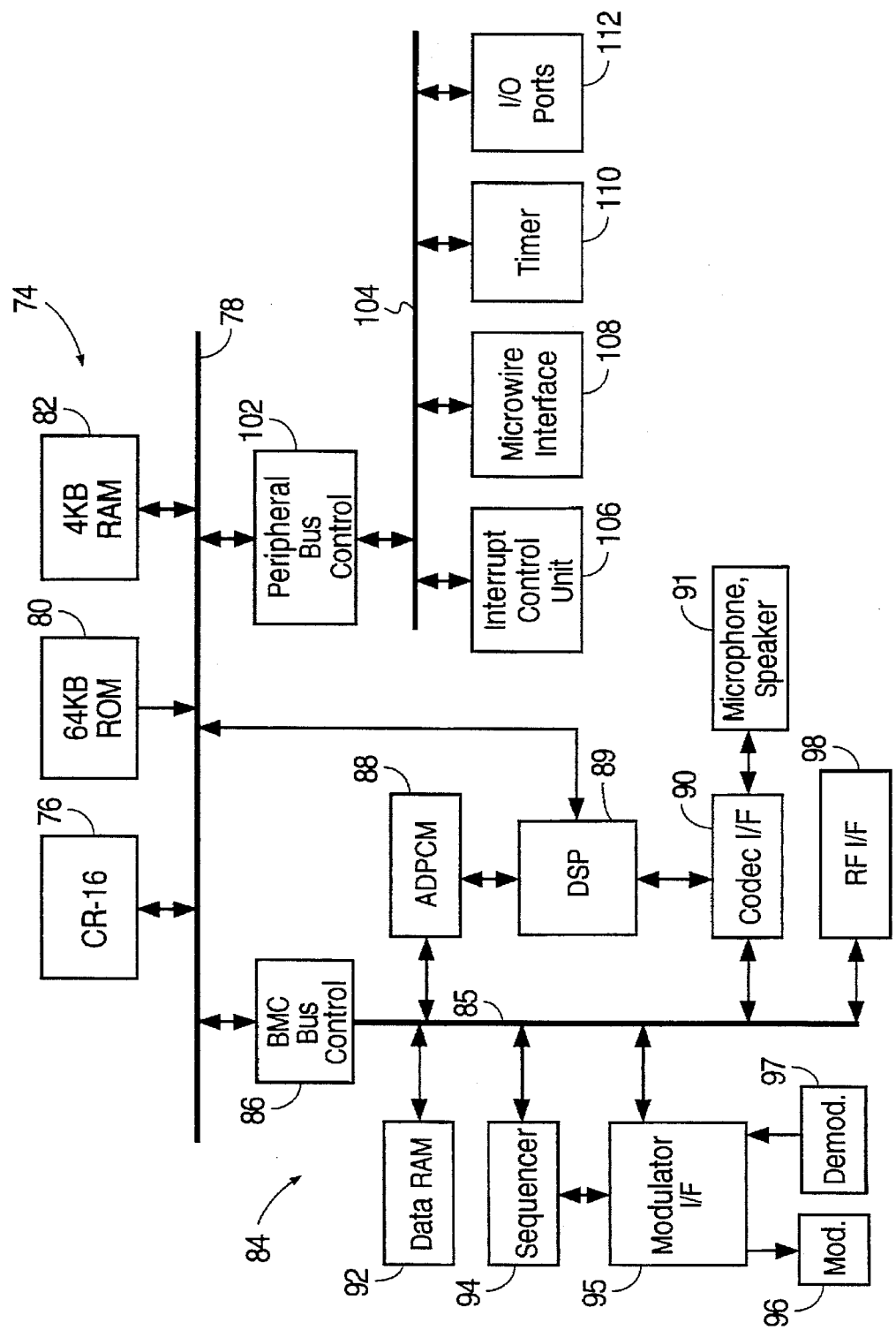
FIG. 5 illustrates the basic architecture used in the preferred embodiment TDMA system transceiver.

FIG. 5 illustrates the preferred embodiment TDMA controller architecture incorporating a novel sequencer. This architecture may be used in a TDMA system such as shown in FIG. 1. The TDMA controller 74 includes a microprocessor 76, such as a model CR-16 from National Semiconductor Corporation, connected to a system bus 78 along with a program ROM 80 and RAM 82.

A burst mode controller (BMC) 84 is also connected to system bus 78 and consists of a number of components. A BMC bus 85 is connected to system bus 78 via a BMC bus controller 86, whose general function would be understood by those skilled in the art. BMC bus controller 86 includes an address generation unit, a bus interface unit, and state machines for controlling access to data RAM 92.

An ADPCM voice coder 88 provides encoding and decoding of audio information. A digital signal processor 89 interacts with voice coder 88 and an interface unit 90 to generate the audio information bits to be transmitted. A microphone and speaker 91 are connected to interface unit 90.

A data RAM 92 contains certain protocol bits and data bits which will be called upon during operation of the TDMA controller to build a slot for transmission.

A sequencer 94, which will be described in detail later, is the device that builds the slots for transmission at synchronized times. A modem interface unit 95 receives control signals from sequencer 94 and, in response, retrieves the bits from various sources for building the serial bit stream in a slot. The serial bit stream for transmission is sent to a modulator 96, while a demodulator 97 sends a received bit stream to modem interface unit 95 for processing. The demodulator 97 also contains modules for performing clock and slot synchronizing, whereby matching synchronization/clock codes cause modem interface unit 95 to issue synchronization signals to sequencer 94.

An RF interface 98 circuit is also included. The RF interface 98 circuit is typically comprised of an additional microwire interface intended to load a PLL synthesizer(s) in the RF deck and also provides control signals to the RF deck, such as various transmit/receive, power down, antenna steering, or RSSI capture signals.

The peripheral devices and their controllers are also connected to system bus 78. Such devices, include, for example, a peripheral bus control 102 for coordinating access between the system bus 78 and the peripheral bus 104, an interrupt control unit 106, a microwire interface 108 for interfacing with, for example, a digital answering machine, a timer 110, and the various input/output ports 112 which are connected to, among other things, a transmitter and receiver portion of the transceiver. Since the invention primarily deals with the operation and construction of sequencer 94, the remaining hardware may be conventional or slightly modified in view of the novel aspects of sequencer 94.

Figure 2:
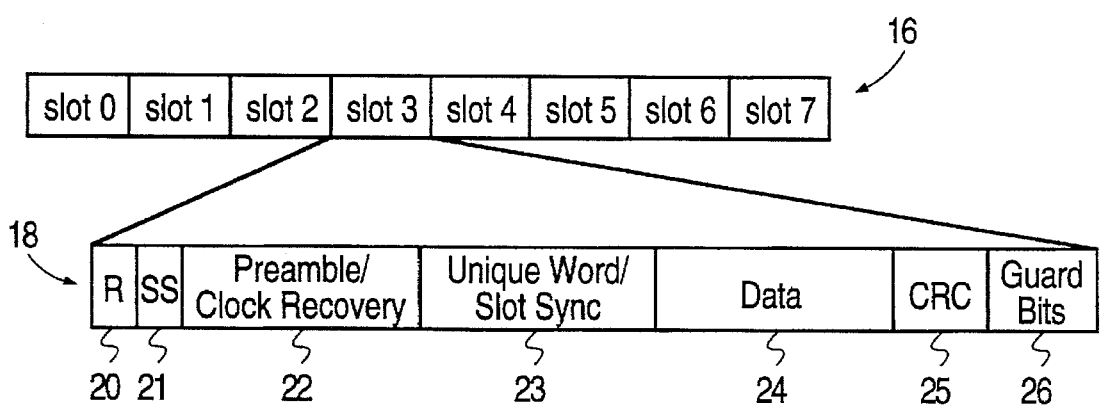
FIG. 2 illustrates the transmitted frames and slots on a single frequency channel in a conventional TDMA system.
Figure 3:
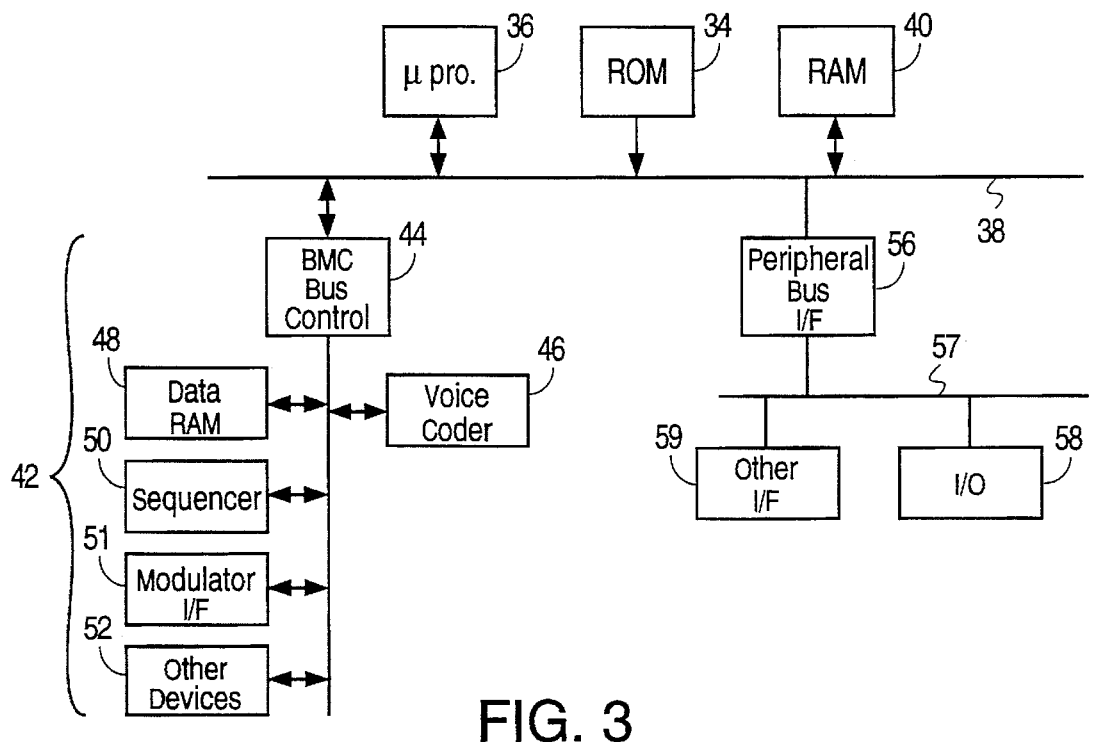
FIG. 3 illustrates selected hardware used in a conventional TDMA system transceiver.
Figure 4:
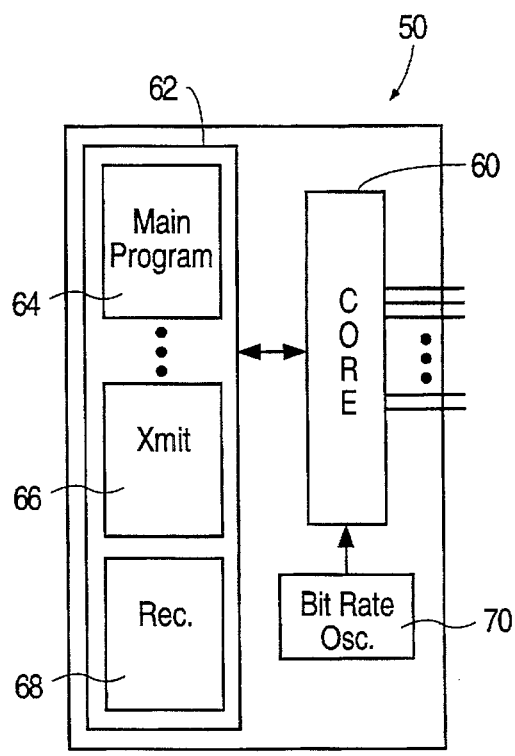
FIG. 4 illustrates additional detail of the sequencer used in the conventional TDMA transceiver.

As previously described with respect to FIGS. 2 and 3, the operation of a sequencer in a TDMA controller is to issue multi-bit control flow signals to the transmit and receive modulator interface modules in order to build the slots within a frame and ensure the bits within the slots are synchronized with the base cell transceiver.

Figure 6:
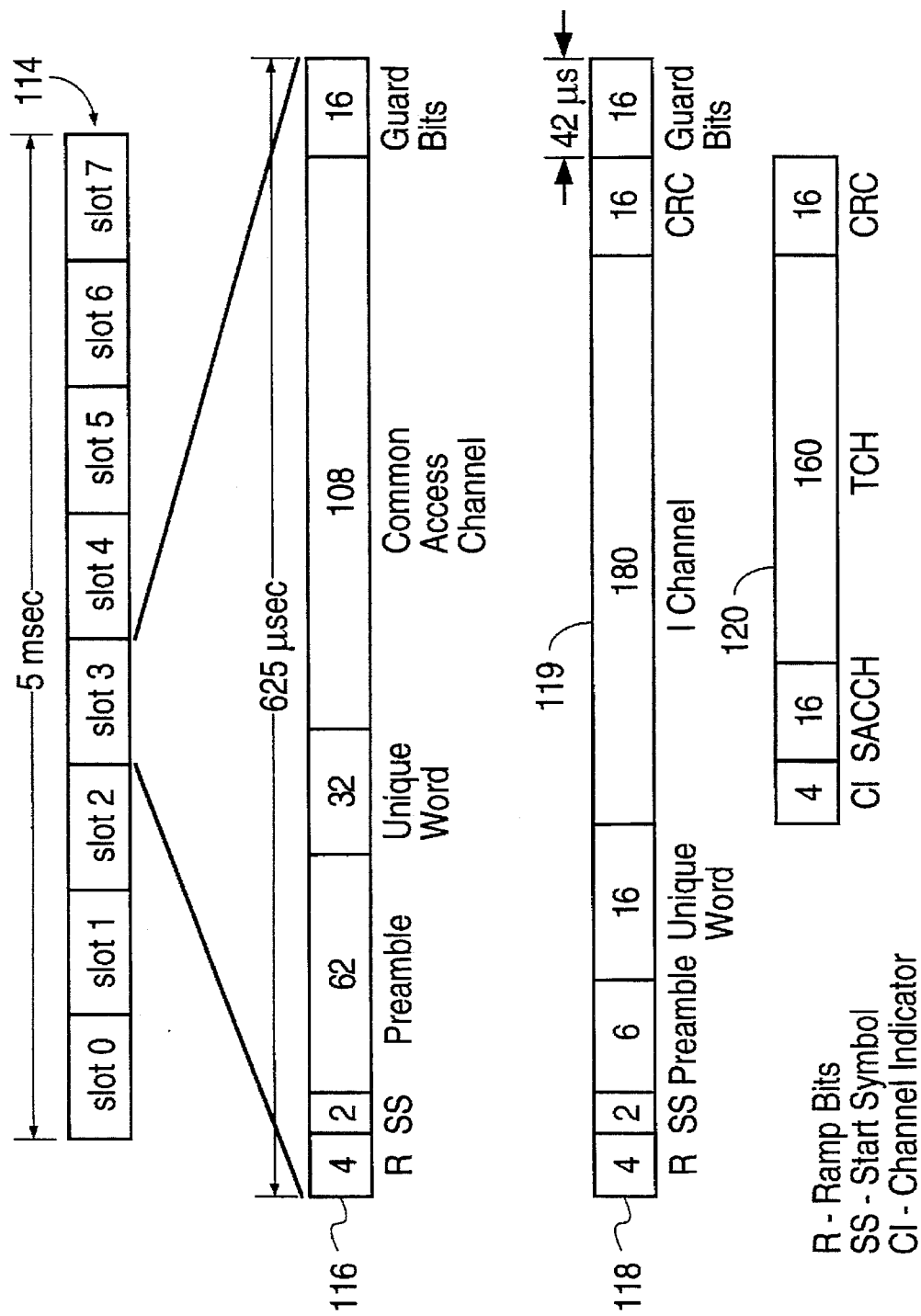
FIG. 6 depicts protocols for a particular TDMA system which are built using finite state machines.

FIG. 6 illustrates the protocol used for a Personal Handy Phone System, in which the present invention may be utilized. The present invention, however, may be used in any TDMA system although the PHS protocol will be used as an example.

The PHS frame 114 is 5 msec and continually repeats while the system is on. Frame 114 is for a single frequency channel. Other frequency channels would include identical frames. Each slot 0–7 represents a burst of information being transmitted from a wireless telephone or by the base cell. Each slot has an allocation of approximately 625 microseconds. As described with respect to FIGS. 1 and 2, a first telephone using the frequency band may transmit on slot 0 of each frame 114 and receive on slot 4 of each frame 114. A second telephone using the system may transmit on slot 1 of each frame 114 and receive on slot 5 of each frame 114.

Similar allocations of slots 2, 3, 6, and 7 apply to third and fourth telephones also actively interfacing with the base cell of FIG. 1.

While the portable telephone is in a control mode such as in a standby mode or initiating access to the TDMA system, the protocol (or format) of a slot resembles that of protocol 116. In protocol 116, the R field is for ramping up the transmitter to the required power level and thus provides a delay. The Start Symbol (SS) field includes the bits 01. The Preamble field consists of a repeated code 0011 for clock recovery. The Unique Word is a fixed pattern which is used to correlate against a received pattern and obtain synchronization of a slot to be transmitted or received. The next field in protocol 116 is a Common Access Channel which includes various fields in accordance with the RCR STD-28 and provides status and other information in order to set up a telephone call. Guard bits are provided to ensure that bits from consecutive slots do not overlap.

Once a synchronized channel is established for a telephone communication, the protocol now changes to a communication protocol 118, which includes similar synchronization fields, but with different bit lengths as shown in FIG. 6. Protocol 118 includes either an information channel field 119 for non-voice communication or a voice traffic channel 120. Protocol 118, when used for communicating voice traffic, also includes a Channel Indicator (CI) field and a Slow Associated Control Channel (SACCH) field. Since FIG. 6 is in accordance with the RCR STD-28, further details would be understood by those skilled in the art.

Figure 7:
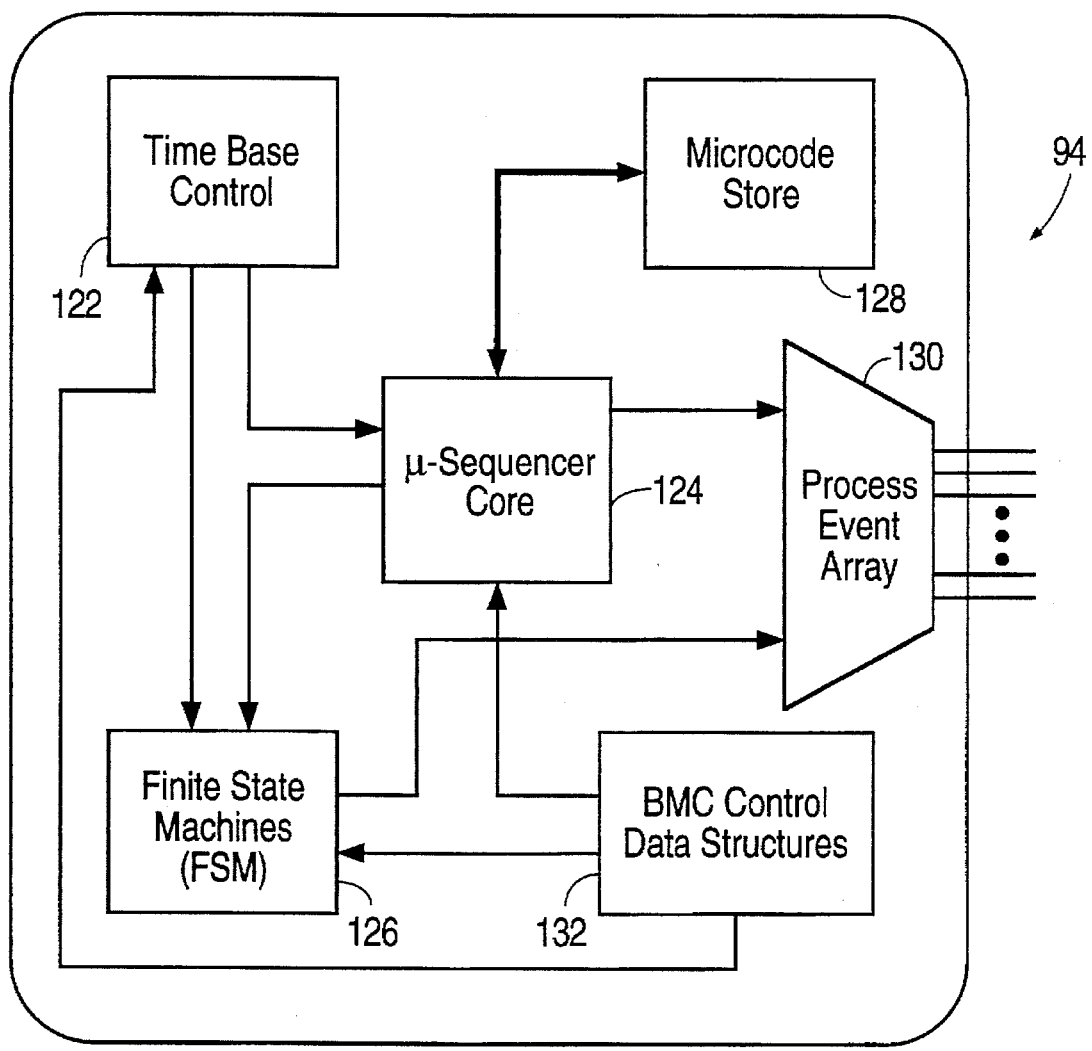
FIG. 7 shows additional detail of a sequencer used in the preferred embodiment.

The building of the slots for transmission and the synchronization of the slot bits with the base cell timing is performed by sequencer 94 in FIG. 5. Further detail of the sequencer 94 of the preferred embodiment is shown in FIG. 7. The relevant portions of sequencer 94 for purposes of this disclosure include the following components. A time base control 122 outputs clock signals synchronized with the bit rate of the base cell (e.g., base cell 14 in FIG. 1). The synchronization of the time base control 122 output is performed in a conventional manner by synchronizing the output of time base control 122 with the received Preamble bits transmitted by the base cell. Synchronization of the start of a slot with the allocated slot time may be performed in a conventional manner by synchronizing the Unique Word (FIG. 6) transmitted by the base cell with the Unique Word field in a slot. The demodulator 97 (FIG. 5) contains the circuitry which generates the synchronizing signals and applies them to sequencer 94.

The time base control 122 provides the timing signals to the sequencer core 124 and the finite state machines (FSMs) 126.

A microcode store 128, which may be a ROM or a RAM, contains a series of commands for the sequencer core 124, which in turn provides enabling commands to the FSMs 126. A simple logic circuit, such as located within the conditional logic block 142, of FIG. 8 may be used to convert a microcode instruction into an enable signal for the appropriate FSM. Unlike the conventional microcode instructions in a sequencer, the microcode instructions in the embodiment of FIG. 7 need not specify each step for creating a slot protocol, such as protocols 116 and 118 in FIG. 6, since the FSMs 126 now perform the function of building the protocols. For example, when a voice transmit sequence is to begin, the microcode store 128 provides an initiate voice transmit command to the micro-sequencer core 124 which then enables the proper FSM 126 to build a slot for the transmit function. In a preferred embodiment, microcode store 128 also contains certain command flow sequences which are sometimes output from the sequencer 94 along with a FSM command flow sequence.

Each of the FSMs 126 is a hardware state machine which provides a sequence of control codes synchronized with the bit rate clock provided by the time base control 122. Each FSM 126 consists of a logic circuit which may be formed of AND gates and OR gates interconnected such that the proper sequence of codes is generated. Typically, one or more signals generated by an FSM 126 will be coupled back to an input node(s) of the FSM 126 to create the sequence of control codes. State machines are well known and can be easily constructed to generate a desired sequence of control codes.

The FSM 126 control codes are then applied to the inputs of the process event array 130, which acts as a combiner and re-times the sequencer's 94 output. The control codes output by sequencer 94 on bus 85 (FIG. 5) essentially enable and disable various devices and operations in the proper sequence and at the proper times to build a slot in the appropriate protocol as shown in FIG. 6. For example, the fixed codes in the Ramp, Start Symbol, Preamble, and Unique Word fields may be inserted into a slot at the proper times by enabling fixed parallel-to-serial storage devices containing those fixed codes. These storage devices may be located in modem interface 95 in FIG. 5.

Audio data for the voice field may be inserted into a slot by enabling a data RAM address (in Data RAM 92) and associated parallel-to-serial circuitry in modem interface unit 95. CRC data may be inserted by instructing a CRC unit in modem interface unit 95 to generate the CRC data.

Since the FSMs 126, and not the instructions in the microcode store 128, build the protocol specific slots, the microcode memory size can be reduced to 64 words as opposed to 256 or 512 words in the conventional microcode memories for a TDMA sequencer. Further, the flexibility of a micro-coded machine is retained. Such flexibility is desired as a single burst-mode controller may be called upon to function with RF decks having dissimilar timing characteristics.

The BMC control and data structure block 132 contains opcode registers for each of slots 0-7 (as described further below), and contains any other data which may be used by FSMs 126 and sequencer core 124, such as the lengths of the various fields in the protocols.

Upon powering up of the TDMA system, the sequencer 94 is reset by the microprocessor 76 (FIG. 5) to allow time for the microprocessor 76 to load any microcode in microcode store 128, assuming microcode store 128 is a RAM and not a ROM.

To more easily modify the series of control codes output from sequencer 94, the sequencer core 124 is provided with a dynamic control architecture, described below with respect to FIG. 8. It should be understood, however, that the dynamic control capability of the sequencer core 124 is not necessary for the sequencer 94 to operate but only augments the sequencer's usefulness.

Figure 8:
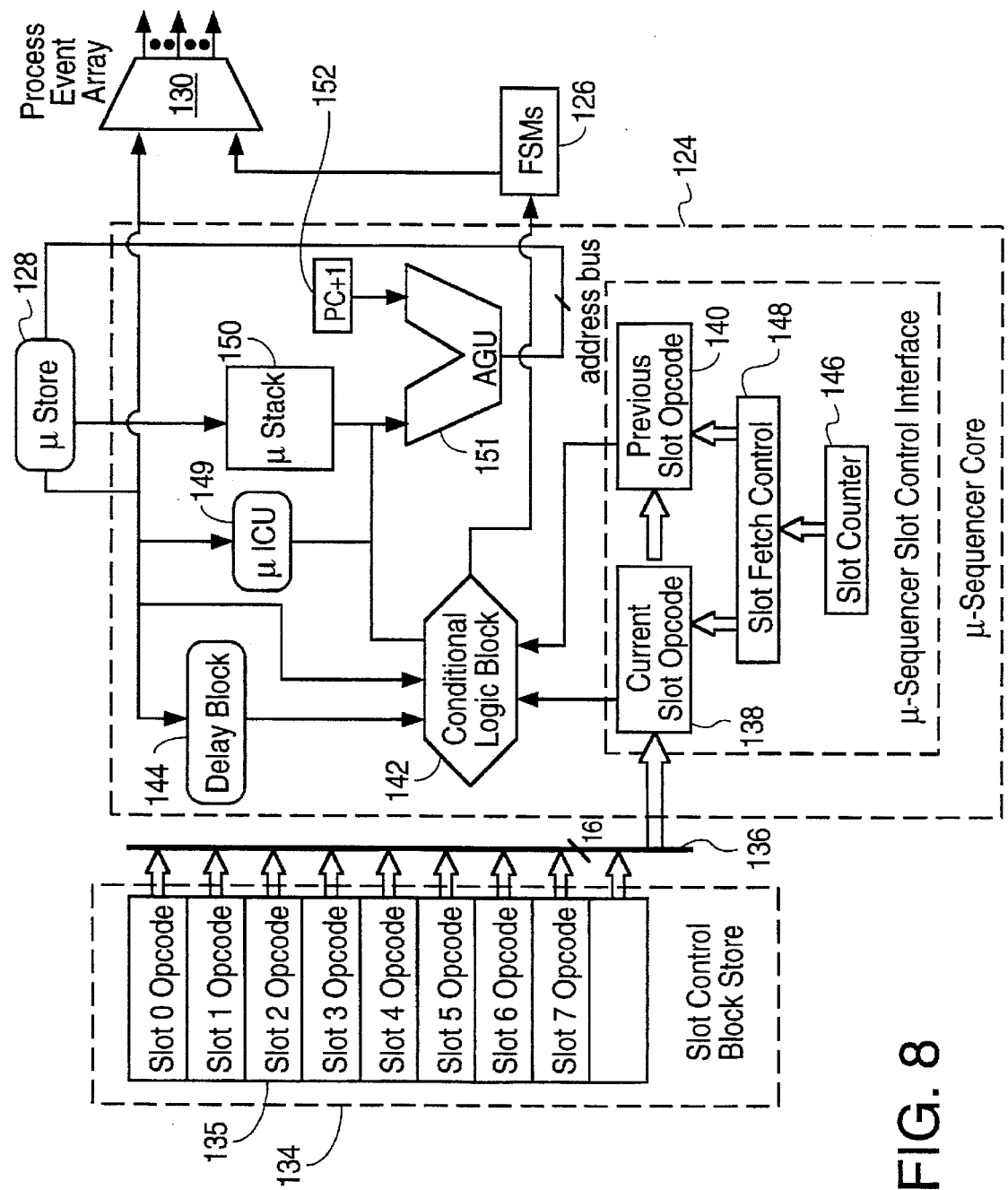
FIG. 8 shows additional details of the sequencer core and its conditional logic capability.

FIG. 8 provides additional detail of the pertinent portions of the preferred embodiment sequencer core 124 and illustrates how the sequencer core 124 acts to dynamically change the modes of the sequencer 94 and how the sequencer core 124 can provide special bits and other custom changes in the generic microcode sequence without modifying the microcode.

A slot control block store 134 contains a 16-bit register 135 for each slot 0-7 in a frame, where the bit positions in a register 135 are associated with particular enable/disable functions. More or less slots may be provided for other frame structures. Opcodes are loaded in the registers 135 by the microprocessor 76 (FIG. 5) as needed to carry out the desired functions. These functions associated with the bit positions in the register may include:

active/inactive slot, gender, transmit/receive slot activity, packet type (e.g., command/control), receive window control (link level), receive signal strength indicator signal (RSSI) measurement enable, PLL load enable, encryption enable, antenna diversity, audio migration control, micro-processor interrupt enable, test mode enable (for a PN sequence only), and any other operations the user desires.

The opcode for each slot is placed, in sequence, on a 16-bit bus 136 for being temporarily stored in either a current slot opcode register 138 or a previous slot opcode register 140. These bits are read by a conditional logic block 142, which determines the status of the particular bits in the opcode and performs a specified function depending upon the condition of the bit(s).

A delay block 144 may be implemented as a down counter which is loaded with a bit count from the microcode store 128 and counts down one count for every bit clock cycle. When this counter reaches a zero count, it enables the conditional logic block 142 to perform the requested function, such as to initiate a voice transmission slot if the transmit bit in the opcode is set. Thus, delay block 144 signals to the conditional logic block 142 when to carry out the requested function. The microcode store 128 is also connected directly to the conditional logic block 142 in order to convey the condition instructions to the conditional logic block 142.

Both the previous slot opcode and the current slot opcode in registers 140 and 138, respectively, are provided to the conditional logic block 142 since certain functions require initiation prior to the beginning of the next slot, such as a ramp up of a transmitter or the need to obtain synchronization prior to the next slot. A slot counter 146 counts the slot position within a frame and controls the slot fetch controller 148 to retrieve the next opcode from the block store 134 at the time when the next slot occurs.

A microcode stack 150, which may be a last-in, first-out (LIFO) buffer, is used in a conventional manner for storing a return address when the microcode store 128 jumps to a subroutine.

A microcode interrupt control unit (ICU) 149 controls the sequencer 94 to be held in wait until sync acquisition, such as upon detection of the end of the Unique Word, as described with respect to FIG. 6. Hence, ICU 149 aligns the output of sequencer 94 with a slot time. ICU 149 basically comprises an AND gate.

The outputs of the conditional logic block 142, the ICU 149, and the microcode stack 150 are applied to an address generation unit 151 for addressing the next instruction in the microcode store 128. Such a next instruction may be a jump to a certain sequence in microcode store 128, such as a transmit routine. Absent any jump indications provided by the conditional logic block 142 or the microcode stack 150, the address in the microcode store 128 is simply incremented by one by the program counter 152. The address may signal the microcode store 128 to apply a control flow sequence to the process event array 130 or may signal the microcode store 128 to initiate a sequence requiring one of the FSMs 126 to generate a control flow sequence. The process event array 130 is controlled, as a combiner, to allow both the microcode sequence and the FSM sequence as an output of the sequencer 94.

The programming of the various opcodes in block store 134 allows modifications to the basic TDMA system program without modifying the microcode in microcode store 128. Additionally, the preloading of the opcodes in the block store 134 avoids any timing problems with the microprocessor 76 (FIG. 5) having to reprogram the microcode to jump to a certain sequence. The programming of the opcodes also enables customized protocols and mode changes without changing the microcode. This also enables the microcode store 128 to be implemented in ROM rather than RAM, saving considerable silicon real estate.

Figure 9:
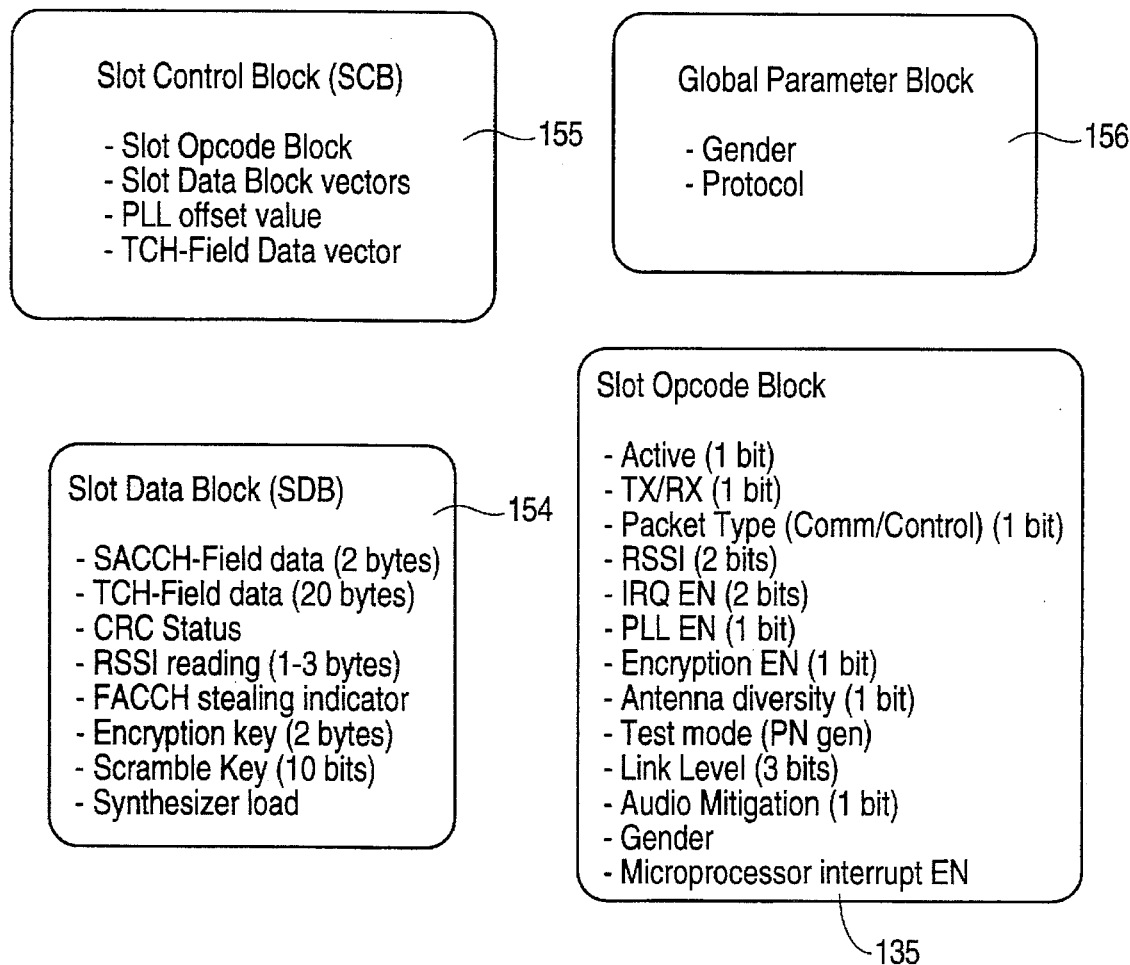
FIG. 9 depicts the information held within various locations in the TDMA system.

FIG. 9 provides additional detail of the possible opcodes which may be programmed into the various opcode registers 135 in the block store 134. FIG. 9 also illustrates the contents of a slot data block 154, which is included in the BMC control data structures 132 in FIG. 7. BMC control data structures 132 provide the sizes of the fields used by the FSMs 126 and the sequencer core 124 when building a slot. FIG. 9 also illustrates the information in the slot control block 155 and the global parameter block 156, also within the BMC Control data structures 132 in FIG. 7.

Figure 10:
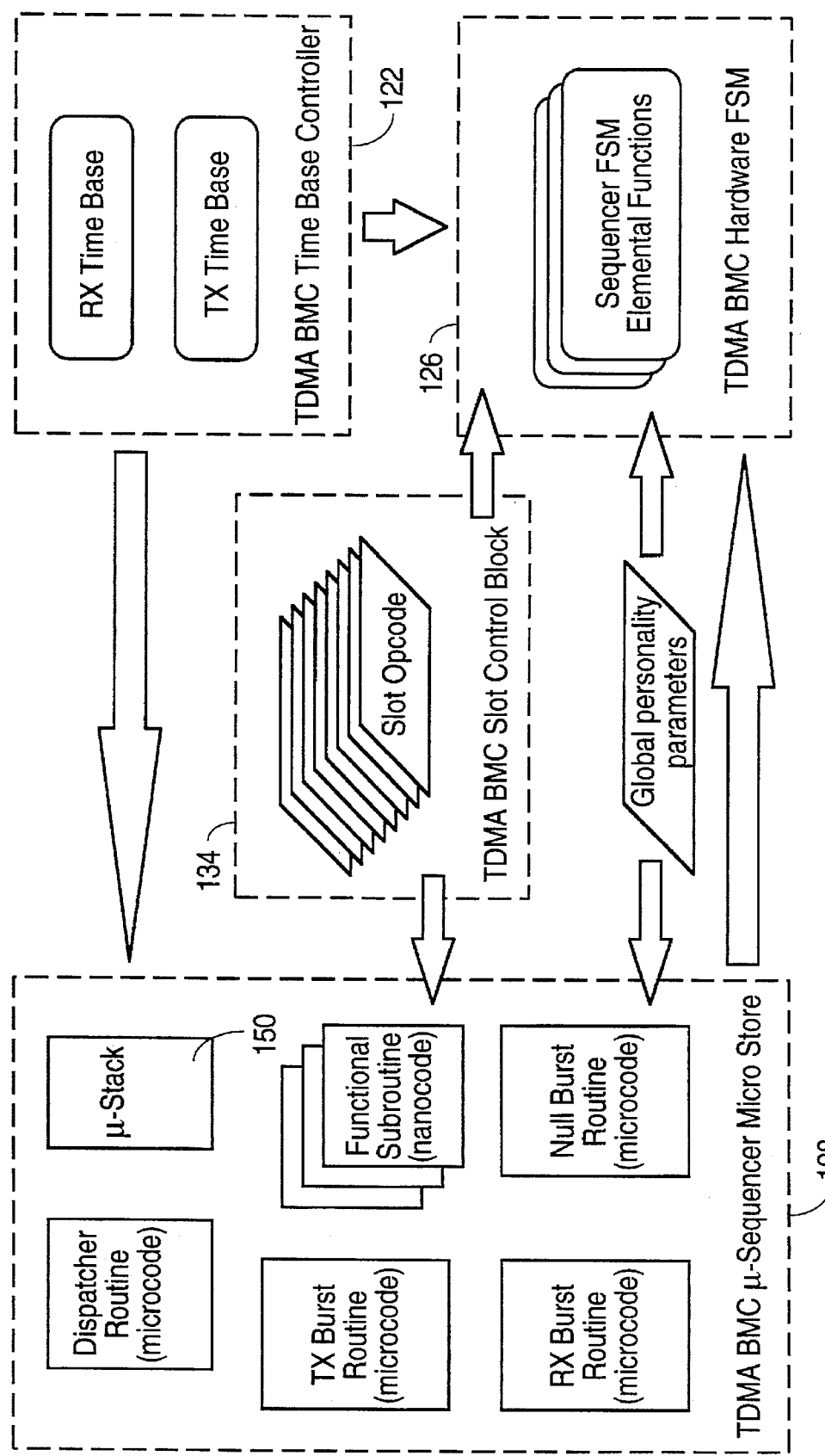
FIG. 10 illustrates the sequencer software/firmware architecture.

FIG. 10 illustrates the sequencer 94 functional software/firmware/hardware architecture identifying the various routines in the microcode store 128, the FSMs 126 functions, the time base control 122 functions, and the slot control block store 134 functions. The files and their functions are self-explanatory.

Figure 11:
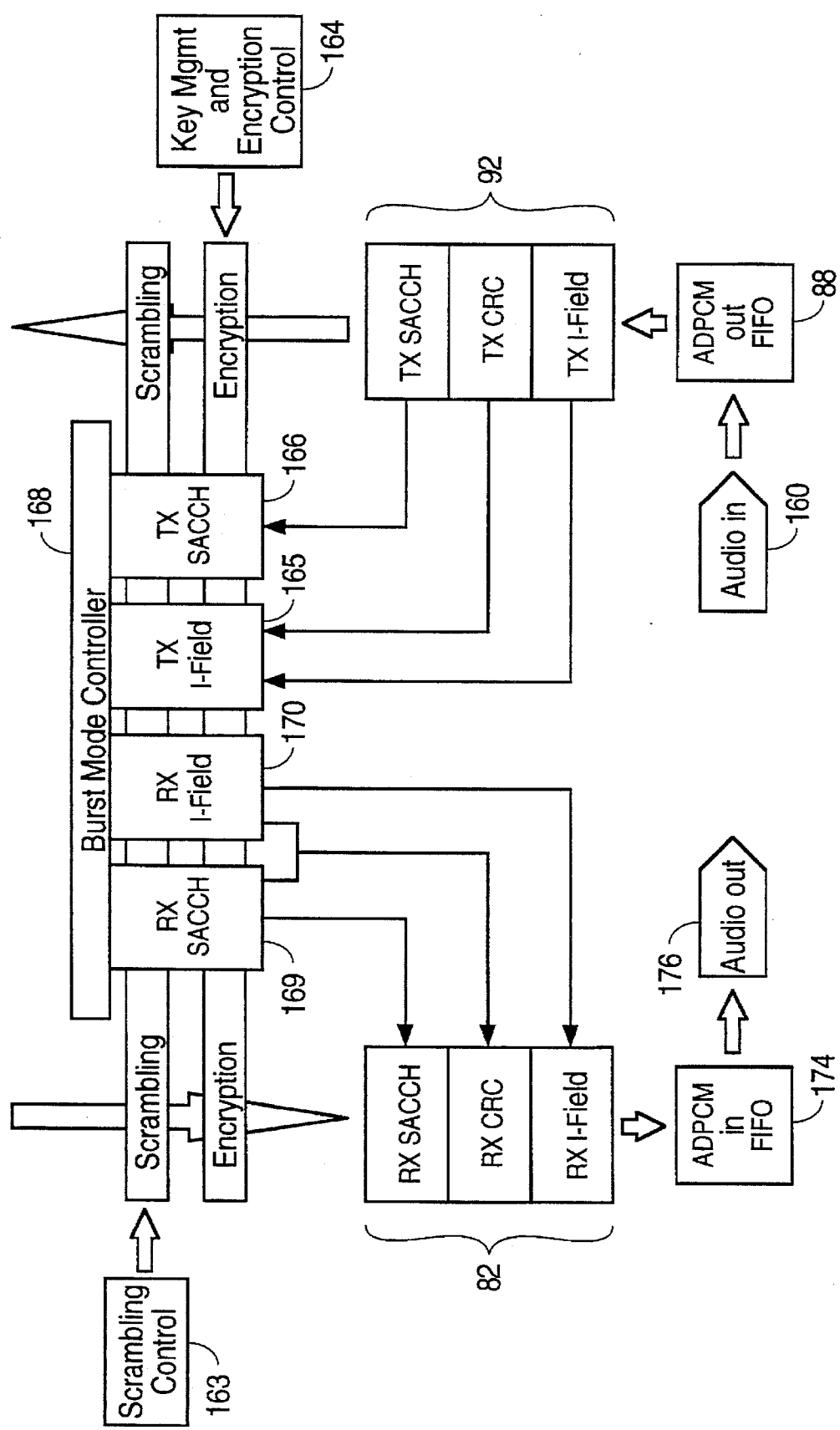
FIG. 11 illustrates the data movement paths in the transmit and receive modes.

FIG. 11 is a high level diagram illustrating how the voice data is created for or retrieved from the information field of a slot during a traffic mode.

In the transmit mode, audio-in signals 160 are converted into adaptive-differential pulse code modulated (ADPCM) signals by voice encoder 88 (also shown in FIG. 5). These signals are then included with other fields, such as the CRC and SACCH data generated in the modulator interface unit 95. These audio related signals are stored in Data RAM 92 (also shown in FIG. 5) and make up the traffic field shown in FIG. 6 for insertion into the slot at the appropriate time. These fields are then scrambled or encrypted under the control of scrambling control unit 163 and a key management encryption control circuit 164 and stored in the appropriate FIFO buffers 165 and 166. A burst mode controller 168 releases the appropriate data into the slot under the control of the FSMs 126 at the appropriate time in the slot.

In the receive mode, the received data within the information field of a slot is stored in FIFO buffers 169 and 170 and then stored in Data RAM 92 for reading and processing by the microprocessor 76 in FIG. 5. The audio information is decoded by decode block 174 and an audio output 176 is generated. The bits for transmission are connected via a serial wire from the modem interface unit 95 (FIG. 5) to modulator 96.

Accordingly, a sequencer for a TDMA controller has been described which performs a multi-tasking function in that the sequencer employs a microcode store for generating certain control flow sequences and instructions as well as employs finite state machines for generating control flow sequences used to create the protocol specific slots for modes such as transmit and receive. The sequencer also employs a microsequencer core which interacts with a conditional logic block and inserts special bits or otherwise changes the functions performed by the sequencer depending upon conditions in an opcode register for each slot. Using this multi-tasking function and the dynamically controlled microsequencer, the microprocessor in the TDMA system does not have to reprogram the microcode store routine. Accordingly, the microcode store routine may be stored in either ROM or RAM. In one embodiment, the microcode store capacity is 64 words, as opposed to 256 or 512 words in the prior art.

In addition to the above, the preferred embodiment system reduces the likelihood of false synchronization when detecting a sequence of bits which coincidentally match the Unique Word in a received slot. The synchronization function of the Unique Word was discussed with respect to FIG. 6. This feature will be referred to as link level control. This link level control provides a variable window in which the remote transceiver will accept the Unique Word code as being the actual synchronizing code.

Figure 12:
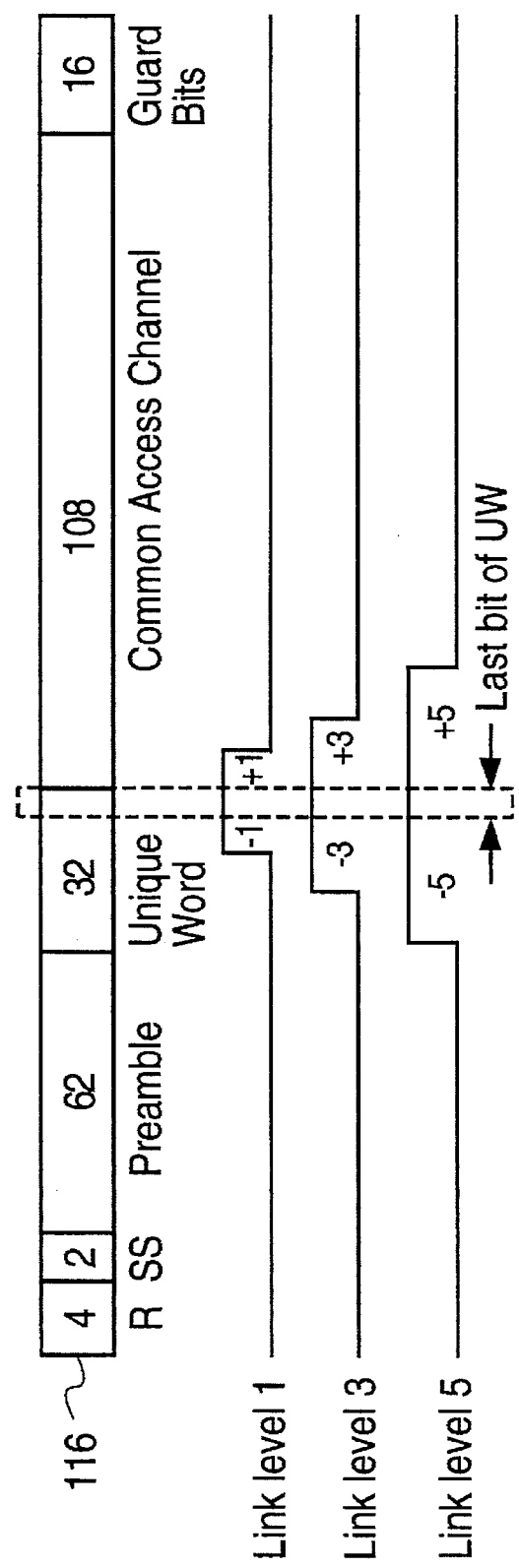
FIG. 12 illustrates the operation of the link levels in avoiding false synchronization.

FIG. 12 graphically illustrates such a link level control. When the remote transceiver is initially powered up, the system will assume a link level 7, corresponding to an infinite window in which any detection of a 32-bit code corresponding to the Unique Word will be assumed to be the synchronization code, and the transceiver will synchronize to the last bit in that code. Once initial synchronization is established by a correlator (located in the modem interface unit 95), the input window for the correlator may be immediately switched to link level 1, shown in FIG. 12. Link level 1 provides a ±1 bit window on either side of the last bit of the expected Unique Word position in a slot. Any 32-bit series which coincidentally matches the Unique Word but whose last bit does not occur within the window does not trigger a false synchronization.

To allow for accumulated time-based disparity, due to changing propagation delays and inherent drifts in the circuitry, the link level may be automatically adjusted between link levels 2–6 to allow for such unpredictability by variably opening up the window. Link level 3 provides a window of ±3 bits, link level 5 provides a window of ±5 bits, etc. Such link levels greatly reduce the likelihood of false triggering of the synchronization circuitry. Selection of the appropriate link level is, in part, determined by the amount of time that has elapsed without looking for the synchronization code. For example, various paging or standby duty cycles, as defined, require certain elapsed times without attempting to synchronize. The link levels are determined by a micro-processor algorithm to allow for such time-based disparity. In certain cases, it may be desired that synchronization never be achieved, and this corresponds to a link level 0. The slot opcode block 135 in FIG. 9 shows that the link level can be dynamically adjusted using a slot opcode.

As the window size increases (indicating an unpredictability in the time a slot is expected to begin), the receiver must be enabled by the sequencer to receive the slot at an earlier time to allow for the expected time disparity.

This disclosure primarily focuses on those non-conventional features of a TDMA controller. Those circuits typically used in TDMA controllers which have not been described in detail may generally be conventional circuits using conventional algorithms. The concept described herein may be applied to any TDMA controller, although the examples herein have focused on the Personal Handy Phone System.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A synchronization method performed by a TDMA communication system, said system transmitting and receiving bursts of serial data within time slots, said method comprising the steps of:

comparing received data with a predetermined slot synchronization code;

detecting a first match between a received synchronization code and said predetermined synchronization code;

determining an amount of time which has elapsed without detecting said synchronization code;

dynamically adjusting a size of a time window for detecting a last bit of a subsequently received synchronization code matching said predetermined synchronization code, wherein said size of said time window is selected based upon an amount of time that has elapsed without attempting to detect said synchronization code; and detecting a received synchronization code whose last bit occurs within said time window and, in response to such detection, synchronizing slot times in said TDMA communication system with said received synchronization code.

2. The method of claim 1 further comprising the steps of:

repeating said steps of dynamically adjusting a size of said time window and detecting said received synchronization code while dynamically adjusting a size of said time window by incremental amounts until said time window is of a desired duration.

3. The method of claim 1 wherein said time window is dynamically adjusted to a duration equal to one bit period of said data.

4. The method of claim 1 wherein said time window is dynamically adjusted to a duration equal to three bit periods of said data.

5. The method of claim 1 wherein said time window is dynamically adjusted to a duration equal to five bit periods of said data.

6. The method of claim 1 wherein said step of dynamically adjusting a size of a time window comprises reducing said size of said time window.

7. The method of claim 1 wherein said step of dynamically adjusting a size of a time window comprises enlarging said size of said time window.

* * * * *

UNITED STATES PATENT AND TRADEMARK OFFICE
CERTIFICATE OF CORRECTION

PATENT NO. : 5,668,813
DATED : September 16, 1997
INVENTOR(S) : Charles J. Malek; David L. Weigand It is certified that error appears in the above-identified patent and that said Letters Patent is hereby corrected as shown below:

```
On the title page, item [73] Assignee: National Semiconductor
Corporation
```

Signed and Sealed this

Seventh Day of April, 1998

Attest:

BRUCE LEHMAN

*Attesting Officer*     *Commissioner of Patents and Trademarks*